(12) United States Patent
Braun

(10) Patent No.: US 12,440,402 B2
(45) Date of Patent: Oct. 14, 2025

(54) WHEELCHAIR WHEEL LOCK LEVER ASSEMBLY

(71) Applicant: Push Lox, LLC, St. Peters, MO (US)

(72) Inventor: Clayton Braun, St. Peters, MO (US)

(73) Assignee: Push Lox, LLC, Troy, MO (US)

( * ) Notice: Subject to any disclaimer, the term of this patent is extended or adjusted under 35 U.S.C. 154(b) by 385 days.

(21) Appl. No.: 17/669,432

(22) Filed: Feb. 11, 2022

(65) Prior Publication Data

US 2022/0280363 A1    Sep. 8, 2022

Related U.S. Application Data

(60) Provisional application No. 63/156,647, filed on Mar. 4, 2021.

(51) Int. Cl.
| | | |
|---|---|---|
| *F16C 1/12* | (2006.01) | |
| *A61G 5/10* | (2006.01) | |
| *F16D 65/28* | (2006.01) | |
| *F16D 63/00* | (2006.01) | |
| *F16D 121/14* | (2012.01) | |
| *F16D 125/60* | (2012.01) | |
| *F16D 125/64* | (2012.01) | |

(52) U.S. Cl.
CPC .............. *A61G 5/1035* (2013.01); *F16C 1/12* (2013.01); *F16D 65/28* (2013.01); *F16D 63/006* (2013.01); *F16D 2121/14* (2013.01); *F16D 2125/60* (2013.01); *F16D 2125/64* (2013.01)

(58) Field of Classification Search
CPC ......... B62L 3/08; A61G 5/1037; A61G 5/101; A61G 5/1035; A61H 2003/046; F16C 1/12; F16D 2121/14; F16D 2125/60; F16D 2125/64; F16D 65/28
USPC .......................................................... 188/2 F
See application file for complete search history.

(56) References Cited

U.S. PATENT DOCUMENTS

| | | | | |
|---|---|---|---|---|
| 3,720,111 A | * | 3/1973 | Guyton | B62M 25/04 |
| | | | | 74/489 |
| 3,803,937 A | * | 4/1974 | Johnston | B62L 3/02 |
| | | | | 74/551.8 |
| 4,644,816 A | * | 2/1987 | Cockburn | B62L 3/02 |
| | | | | 74/489 |
| 4,716,782 A | * | 1/1988 | Jones | B62K 23/02 |
| | | | | 74/551.8 |
| 4,850,241 A | * | 7/1989 | Buckley | B62L 3/02 |
| | | | | 74/489 |
| 5,094,322 A | * | 3/1992 | Casillas | B62K 21/125 |
| | | | | 74/551.8 |
| 5,845,539 A | * | 12/1998 | Huang | B62L 3/02 |
| | | | | 74/489 |

(Continued)

*Primary Examiner* — Bradley T King
(74) *Attorney, Agent, or Firm* — CHUROVICH LAW, LLC; Douglas D. Churovich

(57) ABSTRACT

A lever assembly for a wheelchair having a wheel lock system with two wheel lock assemblies. Each wheel lock assembly including a wheel lock and an actuator with an actuation cable that controllably moves a lock-pin between a locking and an unlocking position relative to the wheelchair wheels. The lever assembly has a body and a lever, with the body attached to the wheelchair and both actuation cables, and the lever attached to and controlling both actuation cables to manipulate the lock-pins to engage or disengage the wheelchair wheels. The lever is adapted for use by disabled occupants.

13 Claims, 6 Drawing Sheets

(56) References Cited

U.S. PATENT DOCUMENTS

| | | | |
|---|---|---|---|
| 6,032,765 A * | 3/2000 | Hsi-Chia | B62L 3/02 74/489 |
| 6,298,744 B1 * | 10/2001 | Huang | B62L 3/08 74/489 |
| 6,308,804 B1 * | 10/2001 | Roberts | A61G 5/101 188/31 |
| 6,341,671 B1 * | 1/2002 | Ebersole | B60T 1/005 188/31 |
| 6,374,694 B1 * | 4/2002 | Chen | B62B 5/0438 74/489 |
| 6,378,663 B1 * | 4/2002 | Lee | A61H 3/04 188/19 |
| 6,457,377 B1 * | 10/2002 | Hsu | F16C 1/18 74/489 |
| 6,471,231 B1 * | 10/2002 | Hargroder | F16D 65/18 188/2 F |
| 6,647,825 B1 * | 11/2003 | Lin | B62L 3/02 74/489 |
| 7,252,300 B2 * | 8/2007 | Hargroder | A61G 5/10 188/24.16 |
| 8,176,810 B2 * | 5/2012 | Lundgren | F16G 11/06 74/502.6 |
| 8,251,380 B2 * | 8/2012 | Liu | A61H 3/00 188/29 |
| 10,737,745 B2 * | 8/2020 | Chang | B60T 1/06 |
| 2009/0058037 A1 * | 3/2009 | Accetta | A61H 3/04 280/267 |
| 2011/0030498 A1 * | 2/2011 | Lundgren | B60T 11/046 29/428 |
| 2011/0089665 A1 * | 4/2011 | Schneider | B60T 7/104 188/31 |
| 2012/0038128 A1 * | 2/2012 | Nimura | A61G 5/1056 280/250.1 |
| 2014/0265188 A1 * | 9/2014 | Chang | A61G 5/101 280/47.4 |
| 2015/0175184 A1 * | 6/2015 | Yadan | B62K 5/05 280/35 |
| 2019/0232929 A1 * | 8/2019 | Chang | B60T 11/08 |
| 2022/0233375 A1 * | 7/2022 | Mullins | A61G 5/1021 |

* cited by examiner

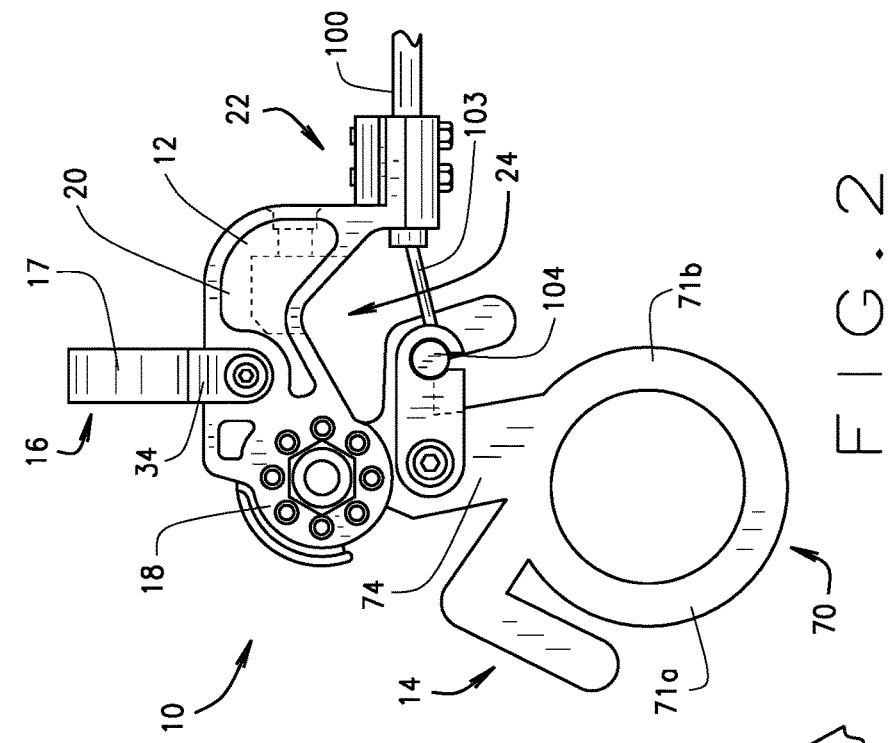
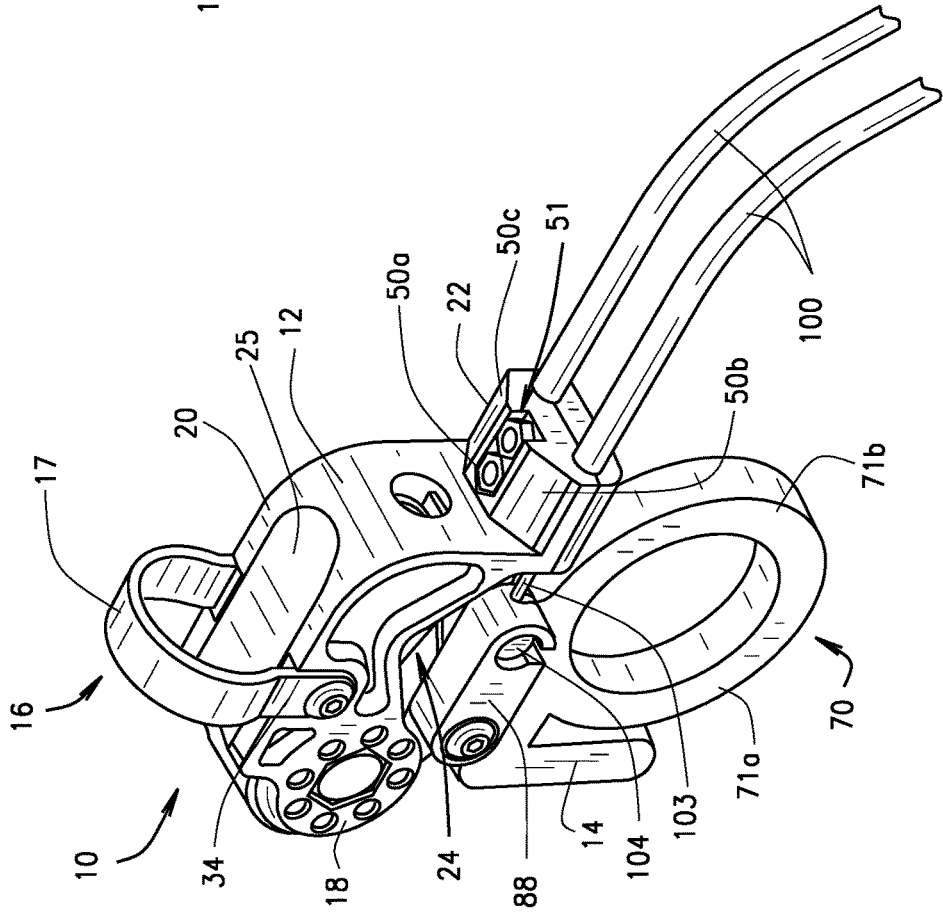

WHEELCHAIR WHEEL LOCK LEVER ASSEMBLY

CROSS REFERENCE TO RELATED APPLICATIONS

This application derives and claims priority from U.S. provisional application 63/156,647 filed 4 Mar. 2021, which application is incorporated herein by reference.

STATEMENT REGARDING FEDERALLY SPONSORED RESEARCH OR DEVELOPMENT

Not applicable.

BACKGROUND OF THE INVENTION

This invention relates principally to a lever for remotely engaging and disengaging a wheel lock, and more particularly to a robust hand-actuated lever assembly for remotely engaging and disengaging a hand-actuated wheel lock for a wheelchair.

The present disclosure comprises improvements to the disclosure presented in U.S. Pat. No. 6,341,671 to Ebersole for a WHEELCHAIR PARKING BRAKE (the '671 Patent), as well as improvements over the commercial version of the wheelchair parking brake in part disclosed and claimed in the '671 Patent. As explained in the '671 Patent: "Existing wheelchair wheel locks based on friction between a moveable portion of a brake, or lock, and the tire or wheel of the wheelchair suffer in effectiveness in that a limited area of contact between the brake and the wheel permit the wheel to slip and rotate under high lateral loads, such as during the egress of the wheelchair occupant from the wheelchair. It is desirable that wheelchair parking brake, or lock, should substantially preclude any further wheel rotation whatsoever, once engaged, nonetheless to being easy and reliable to engage and dis-engage." ('671 Patent at 1:13-22). The '671 Patent discloses a wheelchair wheel system that overcomes such concerns.

However, the wheelchair parking brake or wheel lock system of the '671 Patent and the commercial wheelchair brake systems that have claimed to be covered by the '671 Patent (collectively, the "Ebersole Design"), incorporate several design features that adversely impact the operation and/or durability of the lock system.

For example, for most wheelchairs, each of the two rear wheels rotate independently of the other. Thus, for security and safety reasons, it is important that both wheels be controlled by the person sitting in the wheelchair when locking the wheelchair. Otherwise, should only one rear wheel be immobilized by a lock, the second rear wheel will be free to rotate and thereby allow the wheelchair to pivot uncontrollably about the rear wheel that is immobilized. This constitutes a serious safety hazard for the wheelchair occupant.

It has accordingly been recognized that providing a wheel lock that only engages one rear wheel of a wheelchair is insufficient in that it does not satisfactorily immobilize that wheelchair. Consequently, the commercial version of the Ebersole Design is constructed of two "bookend" wheel locks—one for each rear wheel—that are each connected by cable to a cable "splitter". The cable splitter attaches those two cables to a single cable that then attaches to a single lever near the front of the wheelchair. The single lever is therefore able to simultaneously activate both rear wheel locks. Unfortunately, it has been found that: (i) this cabling configuration of the commercial version of the Ebersole Design routinely breaks and/or binds; and (ii) both wheel locks become inoperable should the single cable that attaches to the lever break or otherwise become inoperable itself. Both of these conditions constitute potential safety hazards for the wheelchair occupant.

Further, the Ebersole Design also suffers from the configuration of its lever, which fails to consider possible limitations of a wheelchair occupant. That is, the Ebersole Design lever comprises an open-ended arm or lever that activates the wheel locks. Unfortunately, many individuals confined to wheelchairs suffer from restricted or constrained use of arms, hands and digits, which can result in their inability to readily grasp or manipulate many simple hand devices, such as an open or straight lever arm. This can make utilization of the Ebersole Design lever configuration problematic.

In addition, the Ebersole Design lever pivot mechanism tends to loosen and even disassemble during use. This can cause the lever to become inoperable or even fall apart. This, again, presents a potential safety hazard for the wheelchair occupant.

It would therefore be desirable to have a wheelchair wheel lock system that incorporates a lever and cable assembly that does not suffer the above-described deficiencies. As will become evident in this disclosure, the present invention provides such improvements over the existing art, and in particular, the Ebersole Design.

BRIEF DESCRIPTION OF THE DRAWINGS

The illustrative embodiments of the present invention are shown in the following drawings which form a part of the specification:

FIG. 1 is a perspective view of a representative lever assembly for a wheelchair wheel lock system incorporating one embodiment of the present invention;

FIG. 2 is a side view of the lever assembly of FIG. 1;

Corresponding reference characters indicate corresponding parts throughout the several views of the drawings.

DETAILED DESCRIPTION

Figure 7:
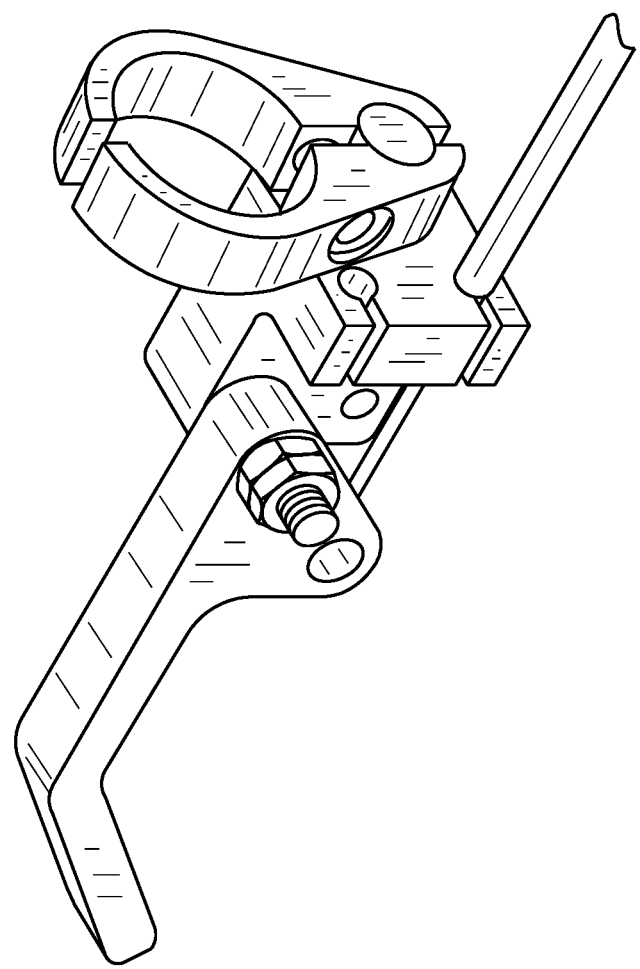
FIG. 7 is a perspective view of a representative commercial embodiment of the lever assembly of the wheelchair wheel lock system disclosed in U.S. Pat. No. 6,341,671.
Figure 3:
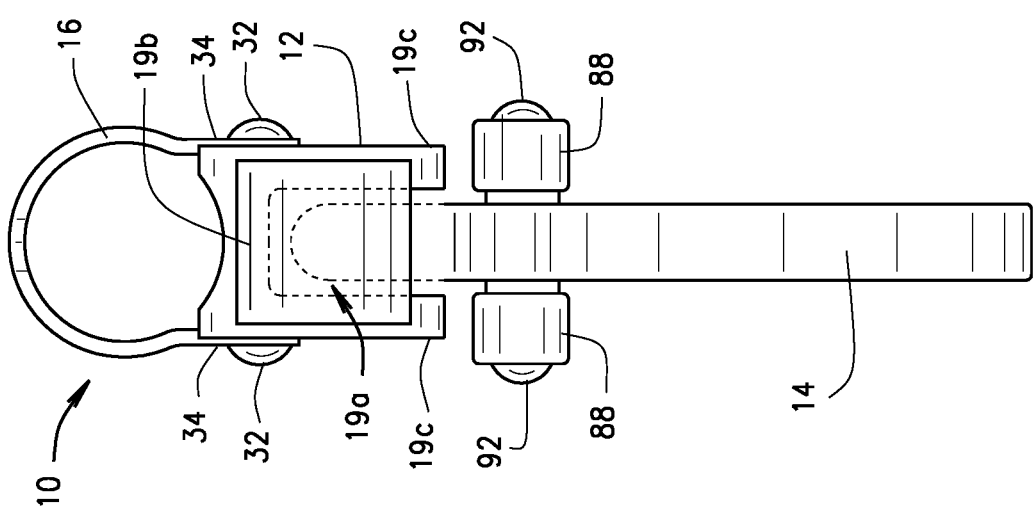
FIG. 3 is a front plan view of the lever assembly of FIG. 1.
Figure 4:
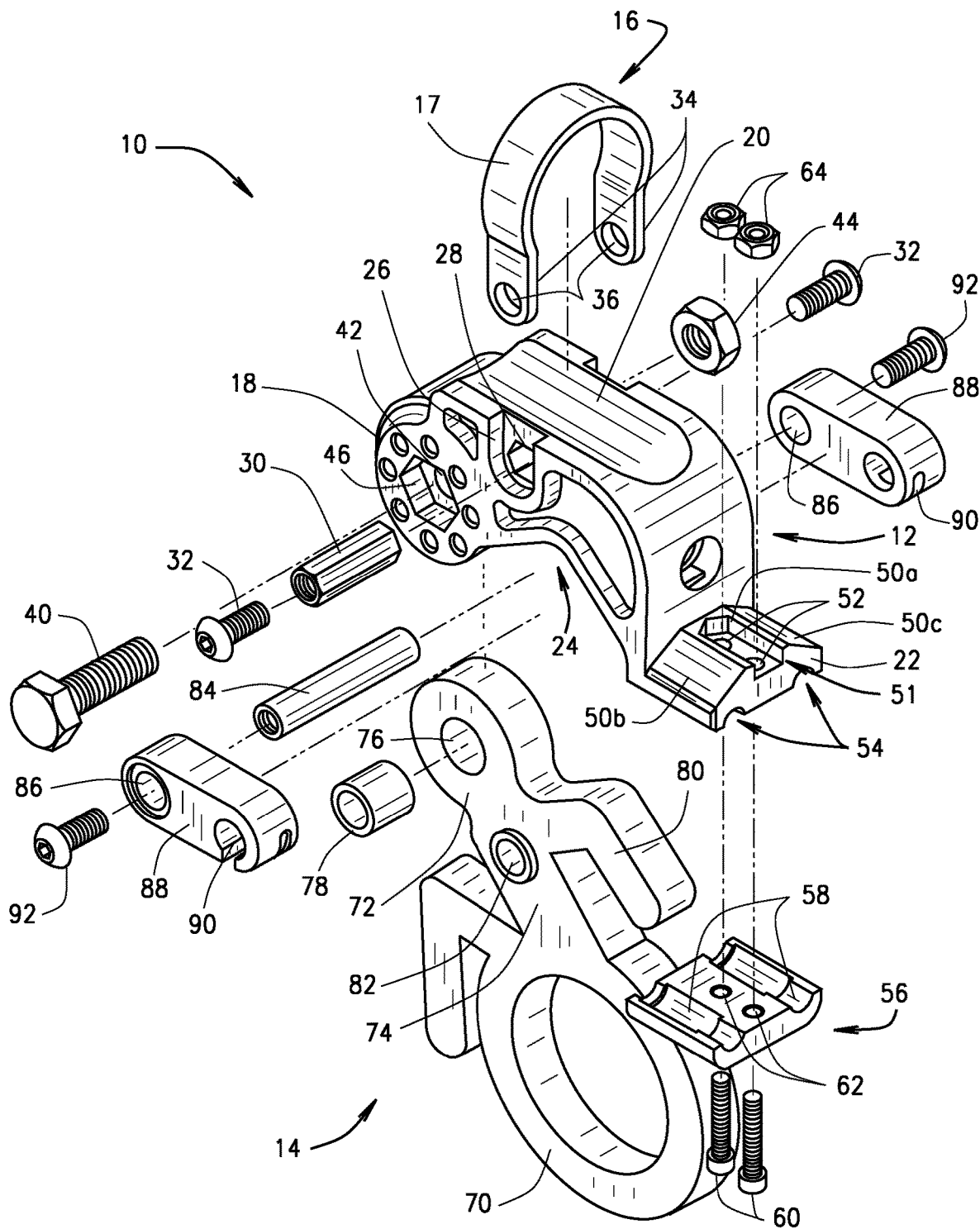
FIG. 4 is an exploded perspective view of the lever assembly of FIG. 1.

The following detailed description illustrates the claimed invention by way of example and not by way of limitation. The description clearly enables one skilled in the art to make and use the disclosure, describes several embodiments, adaptations, variations, alternatives, and uses of the disclosure, including what is presently believed to be the best mode of carrying out the claimed invention. Additionally, it is to be understood that the disclosure is not limited in its application to the details of construction and the arrangements of components set forth in the following description or illustrated in the drawings. The disclosure is capable of other embodiments and of being practiced or being carried out in various ways. Also, it is to be understood that the phraseology and terminology used herein is for the purpose of description and should not be regarded as limiting.

In referring to the Figures, a first representative embodiment of the present disclosure, generally referred to as a wheelchair wheel lock lever assembly 10, is shown by way of example in FIGS. 1-5. As can be seen, the lever assembly 10, constructed primarily of high-strength polymers along with various metal components, has a polymer body 12, a downward directed polymer lever 14 that is rotatably attached to and descends from the underside of the body 12, and a Nylon tube strap 16 that is attached to and extends upwardly from the top of the body 12. The tube strap 16 releasably attaches to a tube frame or other accessible frame structure of a wheelchair (not shown), preferably under or next to the wheelchair seat, in order to secure the lever assembly 10 to the wheelchair in a position where it is readily accessible to the wheelchair occupant.

The body 12 has three integrated elements—a front element 18, a central element 20 and a rear element 22 opposite the front element 18. The front element 18 is a vertically-oriented generally flat disc, approximately one inch thick, that extends forward and slightly downward at an angle of approximately 30-45 degrees from the central element 20. A vertically-oriented disc-shaped slot 19a (FIG. 4), having a uniform width of approximately ⅜ inches, substantially bisects the forward-lower portion of front element 18, while leaving a bridge 19b along the upper rearward portion between each side of the front element 18. In this way, the slot 19a creates two "bookend" disc-shaped tabs 19c on each side of the front element 18.

The central element 20 has a generally elongated cubic shape, approximately one inch thick by two inches long by one inch tall, with a generally horizontally-aligned flat top, but having an inverted "V" cross-channel 24 formed across its underside and a shallow arcuate trough or channel 25 extending along the length of its top side. Recessed detents 26 are formed in each side of the central element 20 at opposing ends of a horizontal hexagonal through bore 28 that extends laterally through the upper end of the central element 20. The bore 28 snugly houses a steel hexagonal extension nut 30 into which is threaded into each end a of matching bolt 32. The bolts 32 secure the tube strap 16 to the central element 20.

More specifically, the tube strap 16 has a thickness of approximately ¼ inch, a uniform width of ¾ to 1¼ inch. The tube strap 16 includes a circular portion 17, having a diameter of approximately one inch when in a state of rest, and two end-rounded attachment tabs 34, each extending downward from opposite ends of the circular portion 17 and each having a hole 36 centered at the bottom of the tab. The tabs 34 are each sized and shaped to fit snugly into, and flush against, the inner sides of the corresponding detents 26 at the sides of the central element 20. Each of the bolts 32 is positioned through one of the two holes 36 in the tabs 34 of the tube strap 16, and then threaded into a corresponding end of the extension nut 30 positioned in the bore 28. The screws 32 thereby readily and removably secure the tube strap 16 to the top of the central element 20 as shown such that the tube strap 16 extends substantially vertically above and perpendicular to the shallow channel 25 atop the central element 20. The holes 36 may alternatively be slotted to provide adjustability to the tube straps 16 when attaching to the wheelchair.

A stainless-steel hex head bolt 40 extends through a matching horizontal through bore 42 in the front element 18 of the body 12 in the circular center of each of the two "bookend" disc-shaped tabs 19c on each side of the front element 18. The bore 42 is shaped and sized to snugly receive the threaded shaft of the bolt 40, and the shaft of the bolt 40 has length that penetrates entirely through the bore 42 and extends approximately one quarter inch beyond the bore 42 on the opposite side of the front element 18. A stainless-steel nut 44 is sized and threaded to thread on and secure to the shaft of the bolt 40. A hex-shaped depression or detent 46 in one side of the front element 18 is centrally oriented about the bore 42 and shaped to snugly receive the head of the bolt 40. The opposite side of the body 12 about the bore 42 has a generally flat surface 48 (not shown) perpendicular to the bore 42.

The rear element 22 of the body 12 extends approximately ¾ inch rearward from the lower end of the central element 20 to form a rectangular horizontal ledge. The upper surface of rear element 22 has three ¼ inch wide flat faces—a horizontal central face 50a, and two opposed "bookend" sloping side faces 50b and 50c that each extend downward from the central face 50a at an angle of approximately 10 degrees. A ⅛ inch deep and 3/16 inch wide linear groove 51 extends longitudinally and centrally across the central face 50a. Two small perpendicular through bores 52 are formed in the groove 51, each longitudinally centered in the groove 51 and separated by approximately ¼ inch. The underside of the rear element 20 is flat and horizontal, but has two small, parallel longitudinal grooves 54 that are aligned parallel to, but to either side of, the groove 51.

The underside of central element 20 mates with a matching generally flat and rectangular polymer lower plate 56. The lower plate 56 has two parallel grooves 58 formed in its upper surface that mate with the grooves 54, such that when the lower plate 56 is properly oriented and pressed against the underside of the rear element 22, the grooves 54 and 58 align to form a pair of parallel bores running toward the underside of the central element 20 of the body 12. Two small perpendicular through bores 62 mate with the bores 52 when the lower plate 56 is properly oriented and positioned against the underside of the rear element 22. A pair of small bolts 60 and matching nuts 64 are positioned in the bores 52 and 62 to properly align and secure the lower plate 56 to the rear element 22.

The lever 14 is generally flat with a thickness of approximately ⅜ inches. The lever 14 includes a large lower circular "ring-shaped" grip 70 with a diameter of approximately 1½ inches, and a smaller upper circular bore 72 with a diameter of approximately ¾ inches. As can be appreciated, the grip 70 is formed of two conjoined legs 71a and 71b (see FIGS. 1, 2), which each provides an opposing inner surface against which the wheelchair occupant can exert pressure or force against the grip 70 to operate the lever 14.

A central trunk 74 extends between and attaches the upper end of the lower grip 70 and the lower end of the upper circular bore 72. The upper circular bore 72 has a center through bore 76 having a diameter of approximately ¼ inch. A short, cylindrical metal sleeve 78 is shaped and sized to fit snugly through the bore 76 to reinforce the bore 76. The length of the sleeve 78 matches the width of the upper circular bore 72.

The upper circular bore 72, housing the sleeve 78 in its center bore 76, has a diameter that substantially matches that of the front element 18 of the body 12, and is shaped and sized to cradle in the vertically-oriented disc-shaped slot 19. When properly positioned in the slot 19, the center bore 76 and the sleeve 78 horizontally align with the through bore 42 such that the bolt 40 extends through the sleeve 78 and center bore 76 of the lever 14 when the bolt 40 passes through the bore 42. In this way, the lever 14 rotatably attaches to, while extending downward from, the front element 18 of the body 12.

When the bolt 40 is positioned in and fully extended through the bore 42, the head of the bolt 40 seats in the hex-shaped detent 46, and the nut 44 can be tightened on the shaft of the bolt 40 to hold the bolt 40 in the bore 42 while maintaining the head of the bolt 40 in the hex-shaped detent 46. As can be appreciated, the nut 44 must be sufficiently tightened so as to prevent the lever 14 from automatically rotating about the bolt 40 due to inherent tensions in the cables, yet slack enough to allow a user to controllably rotate the lever 14 about the bolt 40 to actuate the lever assembly 10. As can also be appreciated, the hex-shaped detent 46 prevents the bolt 40 from rotating about its central axis, and thereby minimizes the potential for the bolt 40 to loosen or disengage the bore 42 as the lever 14 rotates about the bolt 40 during use. Additionally, a lock washer or a polymer-insert lock nut may be used to further secure the bolt 40 in the bore 42.

An upper arm 80 extends generally upward and rearward from the upper end of the trunk 74 just below the upper circular bore 72. The arm 80 is shaped to resemble a human arm with an upward-directed "elbow" such that the lever 14 resembles a stylized human sitting in and leaning forward in a wheelchair. The arm 80 is shaped to cradle in the inverted "V" cross-channel 24 formed in the underside of the central element 20 of the body 12 when the lever 14 is rotated to its most rearward position about the bolt 40.

The lever 14 also has a third lateral and horizontal through bore 82, positioned in the trunk 74 just below the upper circular bore 72. The bore 82 is shaped and sized to loosely receive a metal tube 84 there through, such that the metal tube 84 is able to freely rotate about is longitudinal axis when positioned in the bore 82. The metal tube 84 is approximately 1¼ inches long, and therefore when centrally positioned in the bore 82 extends approximately 7⁄16 inch beyond each end of the bore 82. Each end of the tube 84 fits into a bore 86 at one end of one of a matching bookend pair of short polymer or aluminum cable links 88. Each link 88 is approximately ¾ inch long, ¼ inch wide and ¼ inch thick, with rounded ends and a circular cable nipple slot 90 that is positioned in the end opposite the bore 86 and which runs parallel to the bore 86. The cable links 88 are secured to the trunk 74 of the lever 14 by metal machine screws 92 that thread into the ends of the tube 84. The tube 84 and bores 86 are sized to allow the links 88 to freely rotate about the tube 84 when secured by the screws 92 to the trunk 74 of the lever 14.

Figure 5:
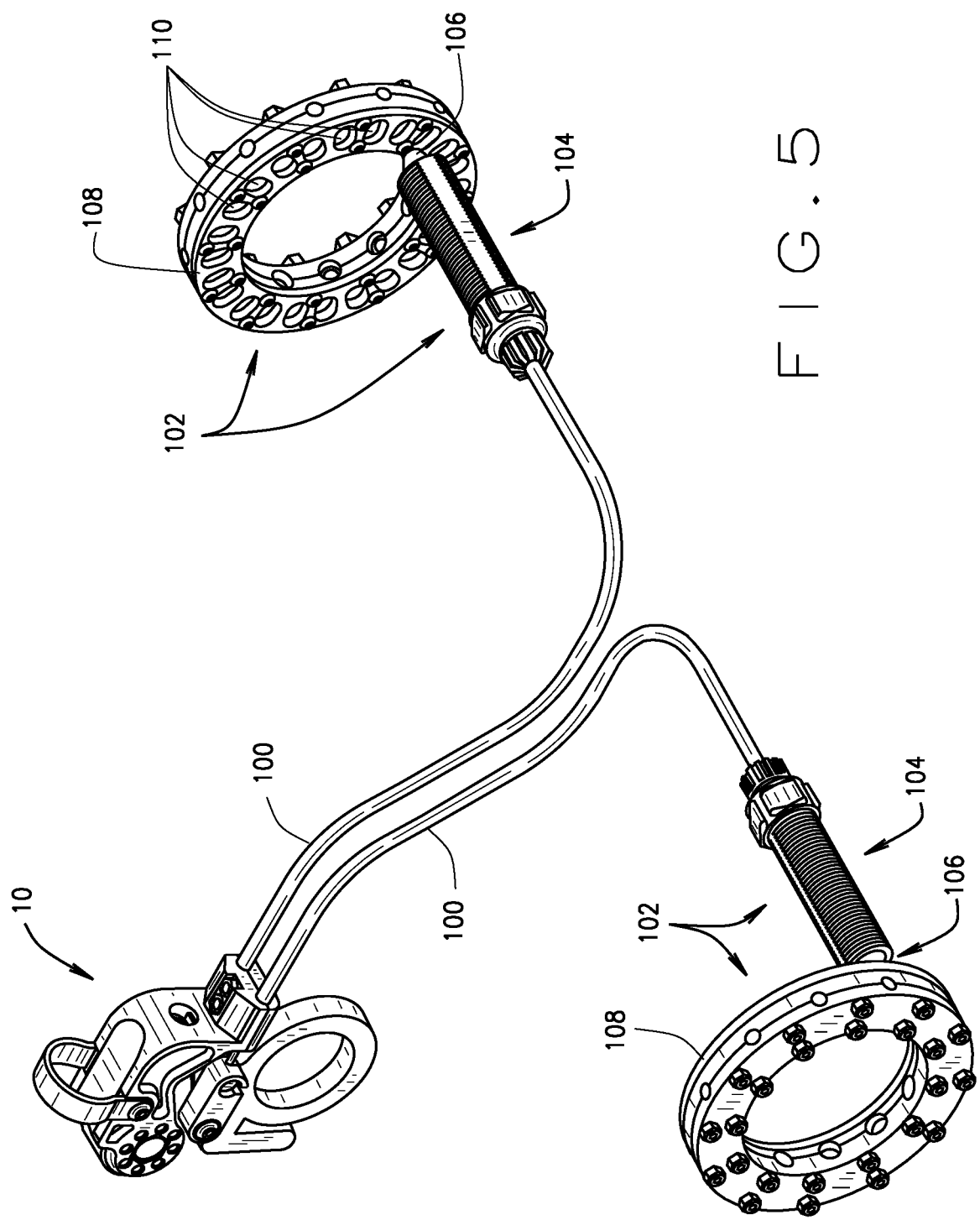
FIG. 5 is a perspective view of the lever assembly of FIG. 1 attached to a pair of brake cables that each extend to a different wheel lock apparatus for separate rear wheels for a wheelchair.
Figure 6:
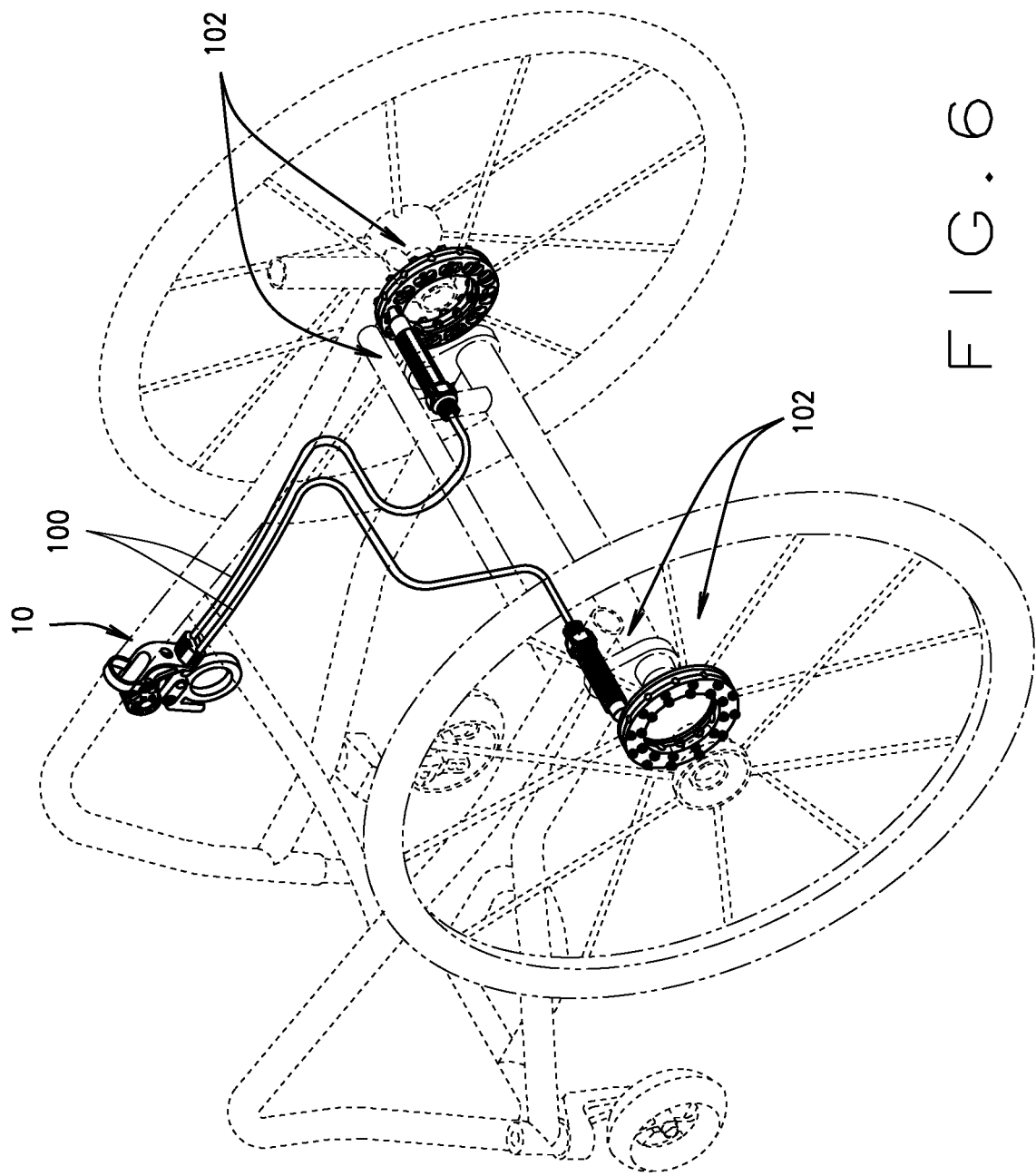
FIG. 6 is a perspective view of the lever assembly of FIG. 1 attached to a pair of brake cables that each extend to a different wheel lock apparatus for separate rear wheels for a wheelchair, depicted with a phantom image of the frame and wheels of a representative wheelchair.

Referring now to FIGS. 1 and 5, it can be seen that the lever assembly 10 is designed to attach directly to one end of a pair of Bowden cables 100, where each cable 100 extends from the lever 14 to one of two representative wheel lock assemblies 102 that are positioned near the rear wheels of the wheelchair. Each of the cables 100 terminates in one of the two clamp bores formed by the grooves 54 and 58 in the rear element 22 of the lever assembly 10, where the end of the cable 100 is rigidly secured. A cable wire 103 extends from the end of the cable 100 and attaches to a nipple 104 which is releasably positioned in one of the two nipple slots 90 of one of the two cable links 88. At the other end, each cable terminates and is attached to one of the two wheel lock assemblies 102.

Referring to FIG. 5, each representative wheel lock assembly 102 comprises a tubular spring-loaded actuator 104, a lock-pin 106 housed in the actuator 104, and a lock ring 108 attached to the wheelchair wheel proximate the actuator 104. The actuator 104 is rigidly attached to the frame of the wheelchair proximate and longitudinally facing its respective lock ring 108 attached to one of the two wheelchair wheels. The lock ring 108 comprises a set of detents or bores 110 that are configured to receive and mate with the tip of the lock-pin 106. The lock-pin 106 retractably protrudes from the end of the actuator 104 that faces the wheel. A spring (not shown) housed inside the actuator 104 exerts sufficient longitudinal spring tension on the lock-pin 106 to hold the lock-pin 106 in a position extended partially out of the actuator 104 in which the tip of the lock-pin 106 engages one of the detents 110 in the lock ring 108. Thus, when extended into one of the detents 110, the lock-pin 106 locks the lock ring 108 and thereby locks the wheelchair wheel to prevent the wheel from rotation about its axle. When sufficient longitudinal force, directed away from the lock ring 108, is applied to the lock-pin 106 to pull it back (i.e., retract) into the body of the actuator 104, the lock-pin 106 disengages from its engagement with the detents 110 in the lock ring 108, and thereby unlocks the wheel and allows the wheel to turn freely about its axle.

Consequently, as can be appreciated by one of ordinary skill in the art, pushing or pulling the lever 14 forward so as to pivot the lever 14 in a forward manner about the bolt 40, simultaneously pulls both inner wires 103 of each the cables 100 forward, and in a direction away from their respective actuators 104. This provides provide sufficient longitudinal force on the wires 103 to overcome the spring tension in the actuators 104 and pull their respective lock-pins 106 out of engagement from their corresponding detents 110 so as to disengage the wheel locks for both wheel lock assemblies 102.

Likewise, pushing (or allowing the springs in the actuators 104) to move the lever 14 backward so as to pivot the lever 14 rearward about the bolt 40, allows the wires 103 in both cables 100 to simultaneously relax and thereby allows the springs in both actuators 104 to urge the spring-loaded lock-pins 106 toward engagement with their respective wheel locks for both wheel lock assemblies 102.

Figure 8:
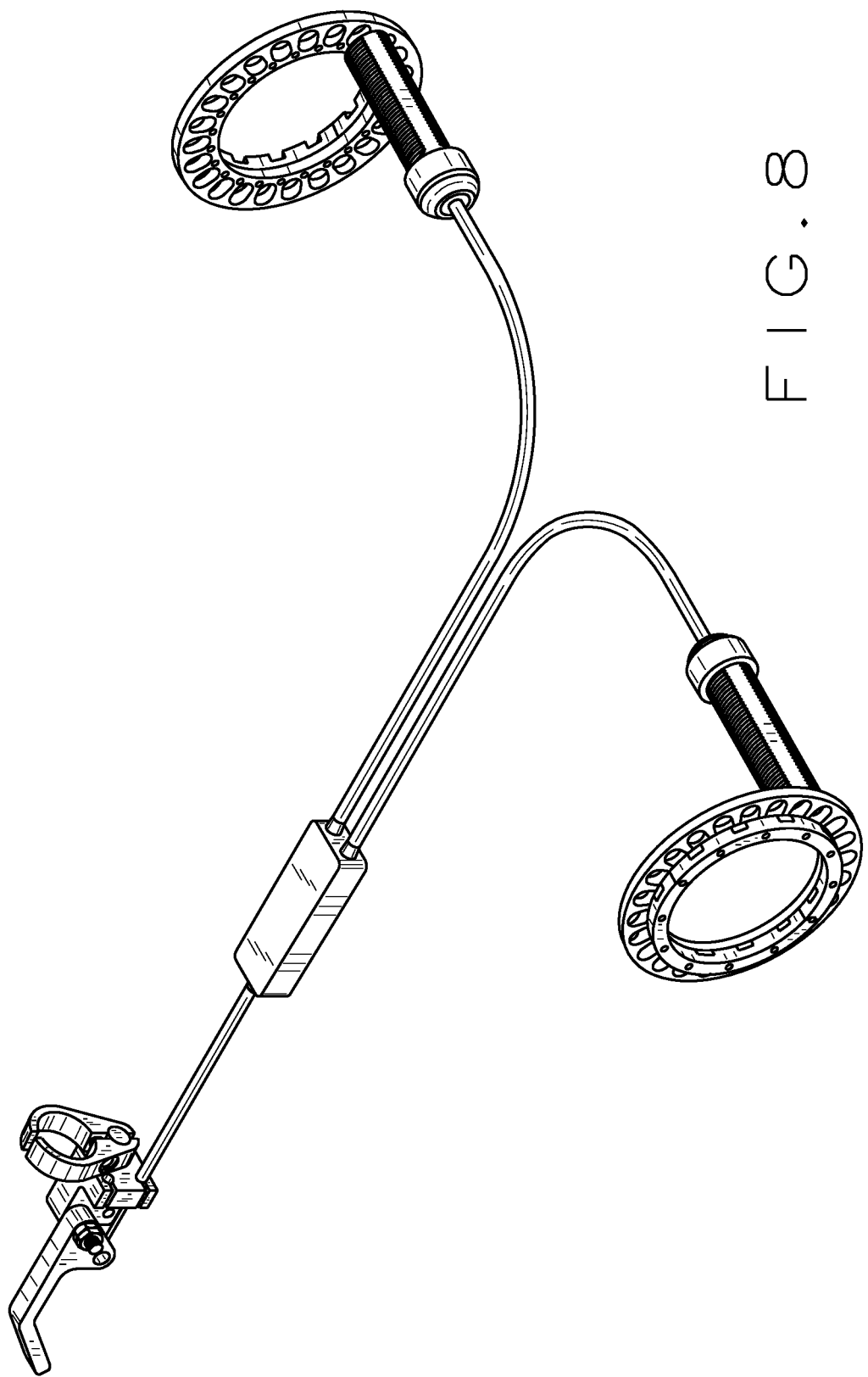
FIG. 8 is a perspective view of a representative commercial embodiment of the wheelchair wheel lock system disclosed in U.S. Pat. No. 6,341,671, including the lever assembly of FIG. 6.

As one of ordinary skill in the art will further recognize, the lever assembly 10 can be used in the same manner as described in the previous two paragraphs when the lever assembly 10 is attached to different wheel-lock assembly configurations, such as for example, the Ebersole design, such as shown by way of example in FIG. 8.

Applicant's novel design and configuration contrasts sharply with preexisting or traditional wheel lock lever assemblies. This includes the Ebersole Design, such as is depicted in FIGS. 7 and 8, in which the lever attaches to a single Bowden cable. The single Bowden cable thereafter engages a cable splitter, from which two separate cables extend, one attaching to each of the two wheel lock assemblies that are positioned near the rear wheels of a wheelchair.

In addition, referring to FIGS. 1, 2 and 5, it will be understood that the lower plate 56 acts as a clamp when attached to the underside of the rear element 22 to firmly and immovably secure each of the cables 100 to the lever assembly body 12. This contrasts sharply with the traditional wheel lock lever assemblies including the Ebersole Design, such as is depicted in FIGS. 7 and 8, in which the single Bowden cable is not clamped to the lever assembly, but rather "floats" in a cavity to house the end of the cable.

Further, it will be understood that the grip 70 has a shape that allows the wheelchair occupant to manipulate the lever even when the occupant has limited use of his/her arms and/or hands and/or one or more digits. That is, in sharp contrast to the simple "arm" of preexisting or traditional wheel lock lever assemblies including the Ebersole Design, such as is depicted in FIGS. 7 and 8, a user with such a disability can readily manipulate the lever 14 of the present design in a multitude of ways, such as for example, placing one or more digits in the ring of the grip 70, grasping the most convenient edge of the grip 70, or simply by pushing or pulling the grip 70. Also, the shape of the grip 70 allows the user to push or pull the lever 14 by placing his/her hand in the "ring" of the grip 70, without having to reposition that hand. That is, the Ebersole Design, as well as any other designs of similar configuration, provide no more than a straight arm or an arm with a simple, shallow elbow for grasping or gripping shape the arm, which can be difficult to the physically impaired to reliably operate. Further, the Ebersole design requires the user to reposition the hand between alternate sides of the lever when alternating between pushing or pulling of the Ebersole lever.

While I have described in the detailed description a configuration that may be encompassed within the disclosed embodiments of this invention, numerous other alternative configurations, that would now be apparent to one of ordinary skill in the art, may be designed and constructed within the bounds of my invention as set forth in the claims. Moreover, the above-described novel lever assembly 10 of the present invention can be arranged in a number of other and related varieties of configurations without expanding beyond the scope of our invention as set forth in the claims.

For example, the lever assembly 10 is not limited to use with specifically two cables 100, but rather can be configured and used in conjunction with one or more than two cables 100. Further, the lever assembly 10 does not necessarily require that the lever 14 have the shape or configuration as depicted. That is, the lever 14 can be alternative constructed, for example, without the grip 70 or the arm 80, or can be constructed with similar features of varying shapes and sizes. For example, the grip 70 can alternately be constructed in an elliptical or an irregular shape, have a smaller or larger opening, or could comprise a slot instead of a closed ring. That is, the grip 70 can have a variety of configurations so long as the grip 70 provides two inner contact points such that the wheelchair occupant is able to push or pull the on the lever 14 without repositioning the occupant's hand. For example, the legs 71a and 71b need not be conjoined, and can be constructed in a variety of configurations, so long as the shape allows the wheelchair occupant to position one or more digits between the legs 71a and 71b, such that the occupant need not reposition that hand to alternate between pushing or pulling the lever 14 with the grip 70. Also, the lever 14 also need not be uniformly flat, as depicted, but instead could be constructed or formed with varying widths or thicknesses, so long as the lever 14 is able to perform the functions outlined in this disclosure. In addition, the lever 14 need not necessarily rotate about an axis in order extend or relax the cables 100. Rather, the lever 14 could be designed to slide or otherwise shift from one position to another to facilitate the lever functions disclosed herein.

Similarly, the body 12 can have a wide range of shapes and sizes, so long as the body is able to attach to a wheelchair, provides a location to attach the cables 100. For example, the rear element 22 can configured in a wide range of shapes and sizes, and can be positioned at various orientations on the body 12, so long as the element is capable of securing the cables 100 to the body 12 in a manner to allow the lever to properly pull and release the cables 100 as disclosed herein.

Further, the body 12 can be configured to attach to the wheelchair in many different manners and at various different locations on the wheelchair, not just with the single tube strap 16, so long as the body 12 is securely fastened to the wheelchair to allow the lever assembly 10 to operate as described in this disclosure. That is, the body 12 could be configured, for example, to attach with several tube straps to a vertical frame tube instead of a horizontal frame tube. Similarly, the body 12 could be configured to use screws, pins or other attachment devices and/or mechanisms to secure the lever assembly 10 to the wheelchair.

In addition, the wires in the cables 100 need not necessarily be attached to the lever 14 with the cable links 88 as shown. Rather, the wires in the cables 100 can be attached to the lever 14 in other ways, including for example, positioning the nipple slots 90 directly on the lever 14, clamping the wires in the cables 100 to the cable links 88 or directly to the lever 14, or other similar means.

Additional variations or modifications to the configuration of the above-described novel lever assembly 10 of the present invention may occur to those skilled in the art upon reviewing the subject matter of this invention. Such variations, if within the spirit of this disclosure, are intended to be encompassed within the scope of this invention. The description of the embodiments as set forth herein, and as shown in the drawings, is provided for illustrative purposes only and, unless otherwise expressly set forth, is not intended to limit the scope of the claims, which set forth the metes and bounds of our invention.

What is claimed is:

1. A lever assembly for use with a wheelchair having a wheel lock system, said wheel lock system comprising a first wheel lock assembly and a second wheel lock assembly, said first wheel lock assembly having a first wheel lock and a first actuator and a first actuation cable and a first lock-pin in operative engagement with said first actuator, said second wheel lock assembly having a second wheel lock and a second actuator and a second actuation cable and a second lock-pin in operative engagement with said second actuator, each of said first and second actuation cables having a first end and a second end opposite said first end, said first actuator being attached to said first actuation cable first end so as to enable said first actuation cable to manipulate said first actuator to move said first lock-pin between a first position in which said first lock-pin engages said first wheel lock and a second position in which said first lock-pin disengages from said first wheel lock, said second actuator being attached to said second actuation cable first end so as to enable said second actuation cable to manipulate said second actuator to move said second lock-pin between a first position in which said second lock-pin engages said second wheel lock and a second position in which said second lock-pin disengages from said second wheel lock, said first actuator comprising a first biasing member, said first biasing member applying a first engagement force to said first lock-pin, said first engagement force urging said first lock-pin toward its respective said first position, said second actuator comprising a second biasing member, said second biasing member applying a second engagement force to said second lock-pin, said second engagement force urging said second lock-pin toward its respective said first position, said lever assembly comprising:

a. a first cable link, said first cable link having a first end and a second end opposite said first end, said first cable link first end being configured to attach to said first actuation cable second end;

b. a second cable link, said second cable link having a first end and a second end opposite said first end, said second cable link first end being configured to attach to said second actuation cable second end;

c. a body, said body being configured to attach to said wheelchair, said body being further configured to engage said first actuation cable so as to position said first actuation cable second end proximate said first cable link first end, said body being further configured to engage said second actuation cable so as to position said second actuation cable second end proximate said second cable link first end; and d. a lever adapted to rotate relative to said body about a first axis, said lever being rotatably attached to said first cable link second end about a second axis, said second axis being separated from but oriented generally parallel to said first axis, said lever being rotatably attached to said second cable link second end about said second axis, said first and second cable links being adapted to rotate about said second axis independently relative to one another, said lever being movable between a first position relative to said body where said lever exerts a force on one of said cable links, said force being transferred by said one of said cable links to its respective actuation cable so as to cause said actuation cable's respective actuator to urge its respective lock-pin to its respective second position, and a second position relative to said body where said lever reduces said force on said one of said cable links so as to allow said respective actuator to urge its respective lock-pin to its respective first position.

2. The lever assembly of claim 1, wherein said lever freely rotates about said first axis relative to said body.

3. The lever assembly of claim 1, wherein one of said first and second cable links rotates freely about its second end relative to said lever.

4. The lever assembly of claim 1, further comprising a clamp, said clamp applying a force against said lever, said force imparting drag upon said lever rotation.

5. The lever assembly of claim 4, wherein said clamp comprises an adjustment mechanism, said adjustment mechanism allowing for the controllable adjustment of said drag upon said lever rotation.

6. The lever assembly of claim 1, further comprising a cross channel in said body, said cross channel engaging one of said first and second cable links so as to limit the degree of axial rotation of said one of said first and second cable links about said second axis.

7. A lever assembly for use with a wheelchair having a first wheel lock assembly, said first wheel lock assembly comprising a first wheel lock and a first actuator and a first actuation cable and a first lock-pin in operative engagement with said first actuator, said first actuation cable having a first end and a second end opposite said first end, said first actuator being attached to said first end of said first actuation cable so as to enable said first actuation cable to manipulate said first actuator to urge said first lock-pin from a first position in which said first lock-pin engages said first wheel lock and a second position in which said first lock-pin disengages from said first wheel lock, said first actuator comprising a first biasing member, said first biasing member applying an engagement force to said first lock-pin to urge said first lock-pin toward said first position, said lever assembly comprising:

a. a first cable link, said first cable link having a first end and a second end opposite said first end, said first cable link first end being configured to rotatably attach to said first actuation cable second end;

b. a body, said body being configured to attach to said wheelchair, said body being configured to engage said first actuation cable proximate said actuation cable second end so as to position said first actuation cable second end proximate said first cable link first end; and c. a lever, said lever being rotatably attached to said second end of said first cable link, said lever being movable between a first position relative to said body where said lever exerts a lever force on said first cable link, said force being transferred by said first cable link to said first actuation cable so as to cause said first actuator to urge said first lock-pin to its second position, and a second position relative to said body where said lever reduces said lever force on said second end of said first actuation cable so as to allow said first actuator to urge said first lock-pin to its first position.

8. The lever assembly of claim 7, wherein said first wheel lock assembly comprises a transverse horizontal lug attached to said first actuation cable second end said horizontal lug being larger than the diameter of said first actuation cable, said first cable link first end comprises a recess shaped to snugly receive said horizontal lug, and said recess prevents said first actuation cable second end from lateral movement relative to said horizontal lug when said lug is positioned in said recess.

9. The lever assembly of claim 8, wherein said recess comprises a cavity, a first channel and a second channel, said cavity having a longitudinal length oriented generally perpendicular to said first actuation cable, said cavity being configured to snugly receive said horizontal lug, said first and second channels each having a uniform width just slightly greater than the diameter of said first actuation cable, said first channel penetrating into said cavity and extending longitudinally along said cavity, said second channel penetrating into said cavity and extending laterally from said first channel radially toward the first end of said first cable link.

10. The lever assembly of claim 7, further comprising a clamp, said clamp applying a force against said lever, said force imparting drag upon said lever rotation.

11. The lever assembly of claim 10, wherein said clamp comprises an adjustment mechanism, said adjustment mechanism allowing for the controllable adjustment of said drag upon said lever rotation.

12. The lever assembly of claim 7, wherein said wheelchair comprises a second wheel lock assembly having a second wheel lock and a second actuator and a second actuation cable and a second lock-pin in operative engagement with said second actuator, said second actuation cable having a first end and a second end opposite said first end, said second actuator being attached to said second actuation cable first end so as to enable said second actuation cable to manipulate said second actuator to move said second lock-pin between a first position in which said second lock-pin engages said second wheel lock and a second position in which said second lock-pin disengages from said second wheel lock, said second actuator comprising a second biasing member, said second biasing member applying a second engagement force to said second lock-pin, said second engagement force urging said second lock-pin toward its respective said first position, said lever assembly further comprising a second cable link, said second cable link having a first end and a second end opposite said first end, said second cable link second end rotatably connecting to said lever, said second cable link first end being configured to attach to said second actuation cable second end, said first and second cable links being adapted to rotate about said lever independently relative to one another, said lever adapted to rotate relative to said body about a first axis, said lever being rotatably attached to said first cable link second end about a second axis, said second axis being separated from but oriented generally parallel to said first axis, said lever being rotatably attached to said second cable link second end about said second axis, said first and second cable links being adapted to rotate about said second axis independently relative to one another.

13. The lever assembly of claim 7, further comprising a cross channel in said body, said cross channel engaging said first cable link so as to limit the degree of axial rotation of said first cable link relative to said lever.

\* \* \* \* \*